Dec. 20, 1932.                J. R. BATTLE                1,891,632
                                LUBRICATOR
                             Filed Oct. 20, 1927

Inventor
John R. Battle,
By Clifton C. Hallwell
Attorney

Patented Dec. 20, 1932

1,891,632

UNITED STATES PATENT OFFICE

JOHN R. BATTLE, OF ARDMORE, PENNSYLVANIA, ASSIGNOR TO GUN-FIL CORPORATION, A CORPORATION OF DELAWARE

LUBRICATOR

Application filed October 20, 1927. Serial No. 227,380.

My invention relates particularly to that class of lubricators in which the lubricant contained therein is automatically extruded therefrom by a piston or follower, serving as a plunger arranged to be maintained under constantly effected pressure tending to compress said lubricant, and is especially directed to means for controlling the discharge port through which the lubricant is forced by such compression.

The principal objects of my invention are to provide a lubricator that may be readily installed and adapted to lubricate all types of bearings or sliding surfaces and that embodies controlling means so constructed and arranged as to be interchangeable while said lubricator is operatively assembled to control lubricants of relatively different consistency and fluidity and capable of easy adjustment to vary the rate of flow of such lubricants.

Other objects of my invention are to provide a lubricator in which different types of lubricating valves are interchangeably employed for different lubricants or different lubrication requirements and in which their type and positions with respect to the plunger, as well as the position of said plunger in the lubricator and consequent contents of lubricant in said lubricator, are visibly indicated.

My invention further comprehends a lubricator having a lubricant discharging plunger in which the controlling valve is not only adjustable but through which said valve may be withdrawn and replaced by other types of valves without disturbing the assemblage of the other lubricator parts or members.

My invention also includes all of the various novel features of construction and arrangement as hereinafter more definitely specified.

Figure 1:
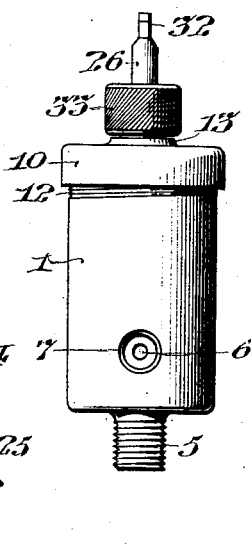
Figure 2:
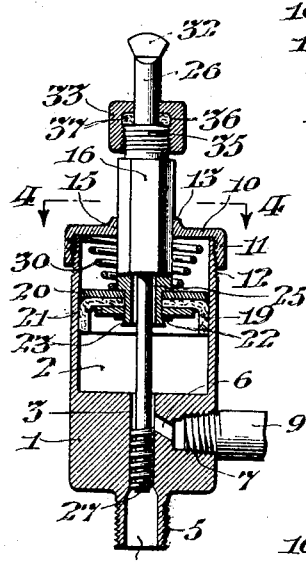
Figure 3:
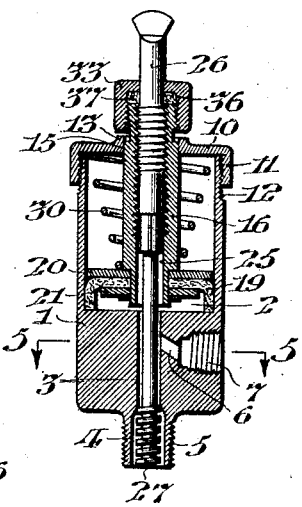
Figure 4:
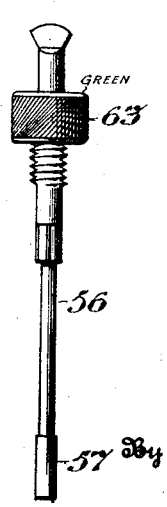
Figure 5:
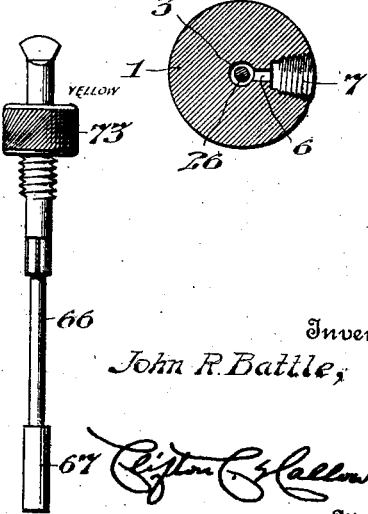
Figures 6, 7, 8, 9:
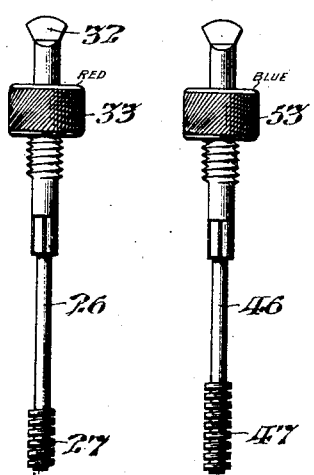

In the accompanying drawing, Figure 1 is an elevational view of a lubricator constructed in accordance with my invention; Fig. 2 is a central vertical sectional view of said lubricator showing parts thereof in elevation for convenience of illustration and indicating the position of said parts when the lubricant is partially discharged; Fig. 3 is a central vertical sectional view of said lubricator in the position shown in Fig. 1 with the lubricant discharged; Fig. 4 is a transverse sectional view of said lubricator taken on the line 4—4 in Fig. 2; Fig. 5 is a transverse sectional view of said lubricator taken on the line 5—5 in Fig. 3; Fig. 6 is a side elevational view of the valve assemblage showing the type of valve adapted for controlling soft grease; Fig. 7 is a side elevational view of the valve assemblage showing the type of valve adapted to control soft or semi-fluid lubricants; Fig. 8 is a side elevational view of the valve assemblage showing the type of valve adapted to control stiff lubricants; and Fig. 9 is a side elevational view of the valve assemblage showing the type of valve adapted to control heavy oils.

In said figures, the lubricator body 1 includes the chamber 2, outlet port 3 having the broadened mouth 4 in the threaded nipple 5 by which the lubricator is attached to a bearing to be lubricated, and the inlet port 6 which is inclined inwardly toward the chamber 2 from the threaded socket 7 in which the intake fitting 9 is engaged.

The intake fitting 9 may be of any desired and well known construction by which a lubricant filling gun may be connected with the lubricator for the purpose of filling the chamber 2 with lubricant and may be provided with the usual check valve to prevent the escape of lubricant from said chamber 2 when the filling gun is withdrawn.

The lubricator body 1 is provided with the closure 10 having the internally threaded flange 11 arranged to engage threads 12 exteriorly disposed adjacent the free open end of the lubricator body 1, and such closure is provided with a boss 13 surrounding a central aperture 15 through which the plunger sleeve 16 is arranged to reciprocate.

Said plunger sleeve 16 is preferably polygonal in form and has the reduced inner end 17 upon which is mounted the piston comprising the inverted cupped leather 19 which is disposed between the reinforcing plates 20 and 21 and held thereon by the washer 22 and the swaged inner end 23 of said plunger sleeve 16.

The plunger sleeve 16 is provided with the bore 25 which is threaded for a portion of its length from its outer end and is arranged to receive the threaded stem 26 of the valve 27, which valve, as shown in Figs. 2 and 3, comprises a plurality of square or flat-sided threads, the outer diameter of which is of substantially the same diameter as the port 3 so as to provide a tortuous spiral passageway between said threads for the passage of lubricant from the chamber 2.

The piston, its plunger sleeve and the valve carried thereby are arranged to be forced inwardly, to extrude lubricant contained in the chamber 2, by the conically coiled spring 30 which is disposed between the closure 11 and the plate 20 of the piston assemblage. The outer end of the valve stem 26 is flattened into fan form 32 and said stem is provided with a hollow gland cap 33 which is slidably mounted thereon and which is internally threaded to engage the threaded nipple 35 forming the outer terminal of the plunger sleeve 16, and said gland cap 33 includes a pocket 36 for the reception of packing material 37 which is arranged to seal the joint between the valve stem 26 and the plunger sleeve 16, as is clearly shown in Figs. 2 and 3.

As shown in Fig. 6, the stem 26 is provided with the valve 27 formed of squared or flat surfaced threads of such length as to be best adapted to control soft grease, pressure-gun grease, heavy semi-fluid lubricant for average bearings with normal clearance and operating temperatures. This type of valve meets the average conditions which are to be met in practice and the cap 33 which is carried by the stem 26 may preferably be colored red for identification of the particular form or type and size of the valve 27.

As shown in Fig. 7, the stem 46 is provided with the valve 47 formed of squared or flat surfaced threads of such length as to be best adapted to control soft or semi-fluid lubricants where bearings have large clearance or are worn, and the cap 53 which is carried by the stem 46 may preferably be colored blue for identification of the particular form or type and size of the valve 47.

As shown in Fig. 8, the stem 56 is provided with the valve 57 which is cylindriform and of less diameter than the diameter of the port 3 in the lubricator body 1 so as to form a substantial clearance therein and of such length as to be best adapted for substantially stiff lubricants such as medium cup grease, and the cap 63 which is carried by the stem 56 may preferably be colored green for identification of the particular form or type and size of the valve 57.

As shown in Fig. 9, the stem 66 is provided with the valve 67 which is cylindriform and of less diameter than the diameter of the port 3 in the lubricator body 1, but of greater diameter than the valve 57 shown in Fig. 8, so as to form a slight clearance therein and of such length as to be best adapted for heavy oils such as steam cylinder oil, black oil, heavy motor oils, semi-fluid lubricants, or where high temperatures melt cup greases, and the cap 73, which is carried by the stem 66 may preferably be colored yellow for identification of the particular form or type and size of the valve 67.

As above stated, the intake fitting 9 may include a check valve such as is usually employed in gun filled lubricators and may have any desired form of engaging means for the grease gun attachment, or said intake fitting 9 may form a system of piping whereby a number of lubricators may be "gang connected" to be filled from a filling line leading from a single refilling station.

It may be here noted that lubricators constructed in accordance with my invention may be filled by a pressure gun while the bearings which are being lubricated are in operation, or on worn bearings, ball or roller bearings, slides, etc., without stopping any of the parts of the machinery embodying said bearings.

My invention is advantageous in that valves of the different types may be interchanged without disturbing the assemblage of the lubricator, by merely loosening the gland cap 33 and unscrewing the valve stem 26 to withdraw the valve 27 through the bore 25, and substituting therefor any of the types of valves 47, 57 and 67 as desired.

I do not desire to limit my invention to the precise details of construction and arrangement as herein set forth, as it is obvious that various modifications may be made therein without departing from the essential features of my invention as defined in the appended claims.

Having thus described my invention, I claim:

1. A lubricator comprising a lubricant container having a port, a plunger in said container by which lubricant may be forced through said port, and a port controlling valve carried by said plunger and having its valve acting portion arranged to be removed and replaced through said plunger.

2. A lubricator comprising a lubricant container having a port, a plunger in said container by which lubricant may be forced through said port, and a port controlling valve adjustably carried by said plunger and having its valve acting portion arranged to be removed and replaced through said plunger.

3. A lubricator comprising a lubricant container having a port, a closure for said container, a plunger in said container extended through said closure, by which lubricant may be forced through said port, and a port controlling valve adjustably carried by said plunger and arranged to be removed and replaced through said plunger, while the parts of the lubricant container are operatively assembled.

4. A lubricator comprising a lubricant container having a port, a plunger having a bore in said container by which lubricant may be forced from said container through said port, and a port controlling valve carried by said plunger and having its stem extended through said bore and arranged to be adjusted with respect to said plunger from without said container, said valve proper being removable and replaceable through said bore.

5. A lubricator comprising a lubricant container having a port, a plunger having a threaded bore in said container by which lubricant may be forced from said container through said port, and a port controlling valve carried by said plunger and having its stem extended through said bore in threaded engagement with the threads thereof and arranged to be adjusted by rotation with said threads to vary its position with respect to said plunger from without said container, said valve proper being removable and replaceable through said bore.

6. A lubricator comprising a lubricant container having a port, a plunger having a threaded bore in said container by which lubricant may be forced from said container through said port, a port controlling valve carried by said plunger in threaded engagement with the threads thereof and having its stem extended through said bore and arranged to be adjusted with respect to said plunger from without said container, and a cap relatively movable on said stem arranged to be threadedly engaged with said plunger.

7. A lubricator comprising a lubricant container having a port, a plunger having a bore in said container by which lubricant may be forced from said container through said port, a port controlling valve carried by said plunger and having its stem extended through said bore and arranged to be adjusted with respect to said plunger from without said container, and a cap slidable on said stem in threaded engagement with said plunger.

8. A lubricator comprising a lubricant container having a port, a plunger having a bore in said container by which lubricant may be forced from said container through said port, a port controlling valve carried by said plunger and having its stem extended through said bore and arranged to be adjusted with respect to said plunger from without said container, and a gland cap slidable on said stem in threaded engagement with said plunger, and having packing seated in said cap arranged to seal the joint between said stem and plunger.

9. A lubricator comprising a lubricant container having a port, a plunger having a bore in said container by which lubricant may be forced from said container through said port, a port controlling valve carried by said plunger and having its stem extended through said bore and arranged to be adjusted with respect to said plunger from without said container, and a cap slidable on said stem in threaded engagement with said plunger, and having packing seated in said cap arranged to seal the joint between said stem and plunger, said valve being removable and replaceable through said bore.

10. A lubricator comprising a body having a lubricant chamber provided with a discharge port, a piston arranged to slide in said chamber and having a plunger sleeve provided with a threaded bore extending exterior to said chamber, a port controlling valve disposed in said port and having a stem extending through said sleeve in threaded engagement therewith, a cap slidably mounted on said stem and having threaded engagement with said sleeve, and packing in said cap arranged to seal the joint between said stem and sleeve.

11. A lubricator comprising a body having a lubricant chamber provided with a discharge port, a closure for said chamber, a piston arranged to slide in said chamber and having a plunger sleeve provided with a threaded bore extending through said closure exterior to said chamber, a port controlling valve disposed in said port and having a stem extending through said sleeve in threaded engagement therewith, a cap slidably mounted on said stem and having threaded engagement with said sleeve, and packing in said cap arranged to seal the joint between said stem and sleeve.

12. A lubricator comprising a body having a lubricant chamber provided with an inlet port and a discharge port, a piston arranged to slide in said chamber and having a plunger sleeve provided with a threaded bore extending exterior to said chamber, a port controlling valve disposed in said discharge port and arranged to control both said inlet and discharge ports and having a stem extending through said sleeve in threaded engagement therewith, said valve being removable and replaceable through said bore.

13. A lubricator comprising a lubricant container having a port, a plunger arranged to discharge lubricant through said port and having a tubular projection extended exterior to said container to indicate the position of said plunger and the consequent contents of said container, a port controlling valve carried by said plunger and having a stem extending exterior thereto to indicate the position of said valve with respect to said plunger and to said port.

14. A lubricator comprising a lubricant container having a port, a plunger arranged to discharge lubricant through said port and having a tubular projection extended exterior to said container to indicate the position of said plunger and the consequent contents of said container, a port controlling valve carried by said plunger and having a stem extending exterior thereto to indicate the position of said valve with respect to said plunger and to said port, and means on said stem arranged to indicate the type of valve employed.

15. A lubricator comprising a lubricant container having a port, a spring pressed plunger having a threaded bore arranged to discharge lubricant through said port and having means extended exterior to said container to indicate the position of said plunger and the consequent contents of lubricant in said container, port controlling valves of different types arranged to be adjustably carried in threaded engagement with said plunger and be interchangeable therewith, said valves being removable and replaceable through said plunger, while the parts of the lubricant container are operatively assembled.

16. A lubricator comprising a lubricant container having a port, means arranged to automatically force lubricant through said port, and port controlling valves of different types interchangeably arranged to be introduced and withdrawn to cooperate with the port walls and control said port under different lubricating conditions while the lubricator parts are in assembled condition.

17. A lubricator comprising a lubricant container having a port, means arranged to automatically force lubricant through said port, said port being adapted to cooperate with the valves of different structures and comprising a plurality of port controlling valves interchangeably associated with said port each having a stem projecting exterior to said lubricator, and having means readily visible on said stem typifying the particular valve disposed in said port.

18. A lubricant cup having a body portion providing a lubricant reservoir, a piston reciprocable in said reservoir, a spring urging said piston toward the discharge end of said reservoir, a hollow stem carried by said piston and movable therewith and a stem located within said hollow stem and having a lubricant flow-controlling portion extending below the piston for passage into the discharge passage of the cup to control the flow of lubricant through the discharge passage, and adjusting means carried by one end of said last mentioned stem and adjustably engaging said hollow stem whereby said flow-controlling portion may be adjusted axially from the exterior of the cup.

19. A lubricator comprising a lubricant container having a port, a plunger arranged to discharge lubricant through said port and having a tubular projection extended exterior to said container to indicate the position of said plunger and the consequent contents of said container, a port controlling valve carried by said plunger and having a stem extending exterior thereto whereby to adjust the position of said valve with respect to said plunger and to said port.

20. A lubricator comprising a lubricant container having a port, a plunger having a bore in said container by which lubricant may be forced from said container through said port, a port controlling valve carried by said plunger and having its stem extended through said bore and arranged to be adjusted with respect to said plunger from without said container, and a cap movable on said stem in threaded engagement with said plunger.

In witness whereof, I have hereunto set my hand this 19th day of October, A. D., 1927.

JOHN R. BATTLE.